United States Patent [19]
Lindberg

[11] 3,818,469
[45] June 18, 1974

[54] FIRE-WALL AND BURN-THROUGH PROTECTION SYSTEM

[76] Inventor: John E. Lindberg, 1211 Upper Happy Valley Rd., Lafayette, Calif. 94549

[22] Filed: June 19, 1972

[21] Appl. No.: 264,080

Related U.S. Application Data

[63] Continuation-in-part of Ser. No. 118,892, Feb. 25, 1971, abandoned, Continuation-in-part of Ser. No. 756,084, Aug. 12, 1968, abandoned, Continuation-in-part of Ser. No. 689,671, Dec. 11, 1967, abandoned.

[52] U.S. Cl. ............................. 340/229, 200/83 R
[51] Int. Cl. .......................................... G08b 19/00
[58] Field of Search .............. 340/240, 229; 200/83; 337/332; 60/200 A; 73/204, 432 R

[56] References Cited
UNITED STATES PATENTS 3,221,319  11/1965  Lindberg, Jr. ...................... 340/229
3,526,139  9/1970  Mayo et al. ........................ 73/432 R Primary Examiner—John W. Caldwell
Assistant Examiner—Daniel Myer
Attorney, Agent, or Firm—Owen, Wickersham & Erickson

[57] ABSTRACT

A hollow fire-wall hermetically sealed and having wall portions that are rigidly spaced apart to provide a sealed chamber, is sealed at a pressure significantly different from atmospheric. This acts to help stop the spread of fires. A change in the pressure toward atmospheric may be detected and used to give a warning or an automatic shut-down of a device beyond the fire-wall, such as an engine. A series of spot welds may insure the rigid spacing apart of the walls, or the fire-wall may be made of a continuously wound tube sealed to itself. "Redundant-type" operation may be provided. Arithmetic average temperature of the sealed chamber may be read. Peak temperature detection may be provided.

20 Claims, 22 Drawing Figures

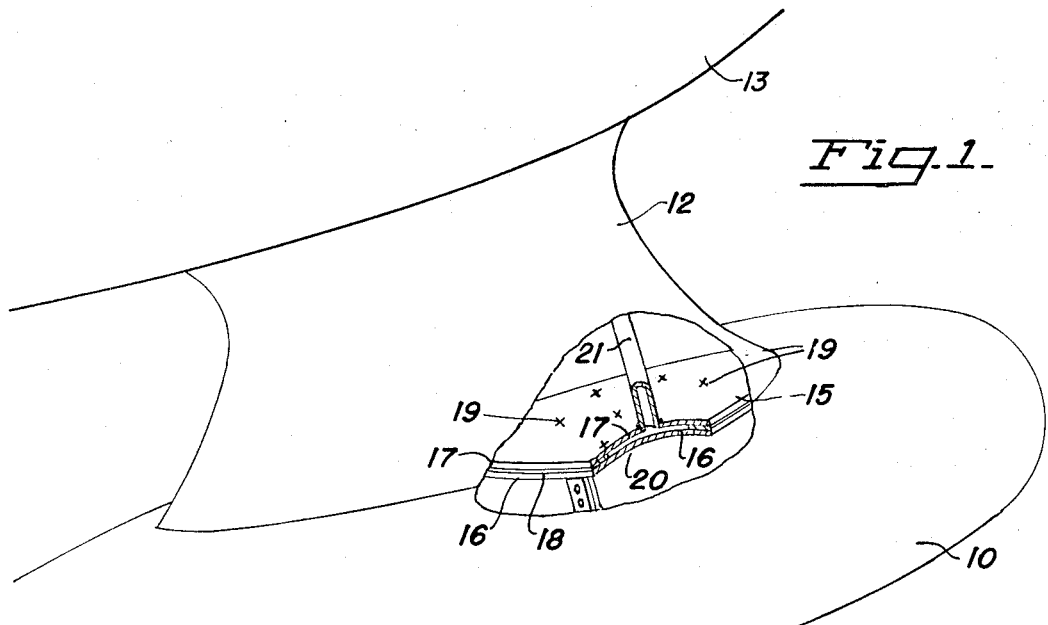
Fig.1.
Fig.2.
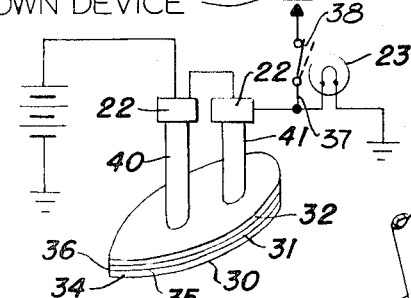
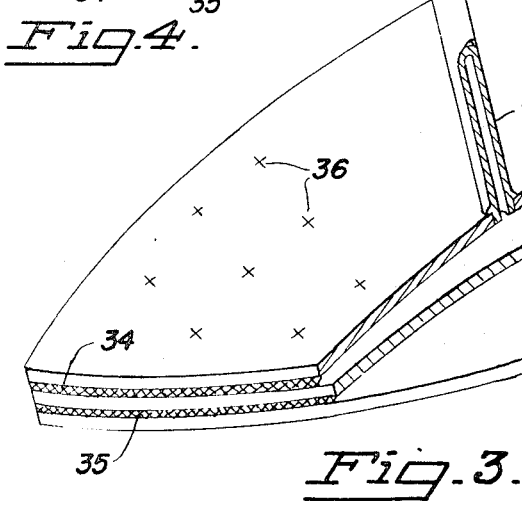
Fig.4.
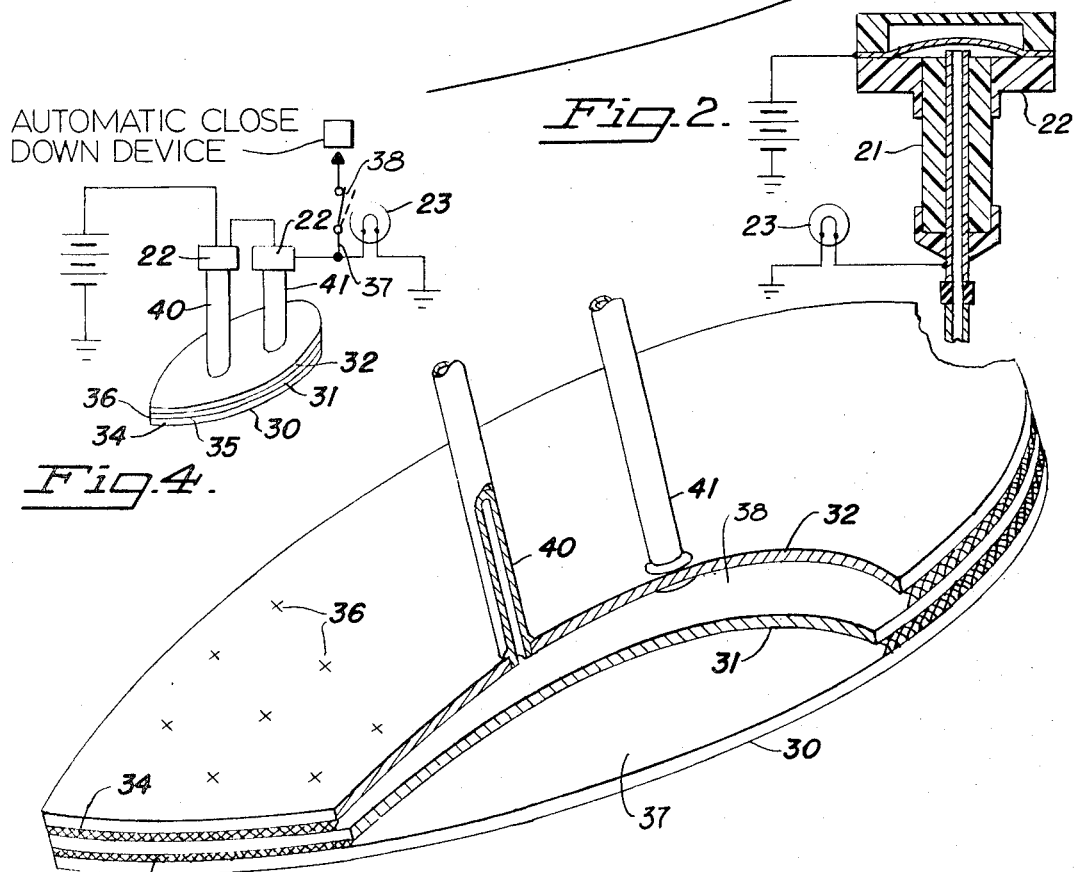
Fig.3.

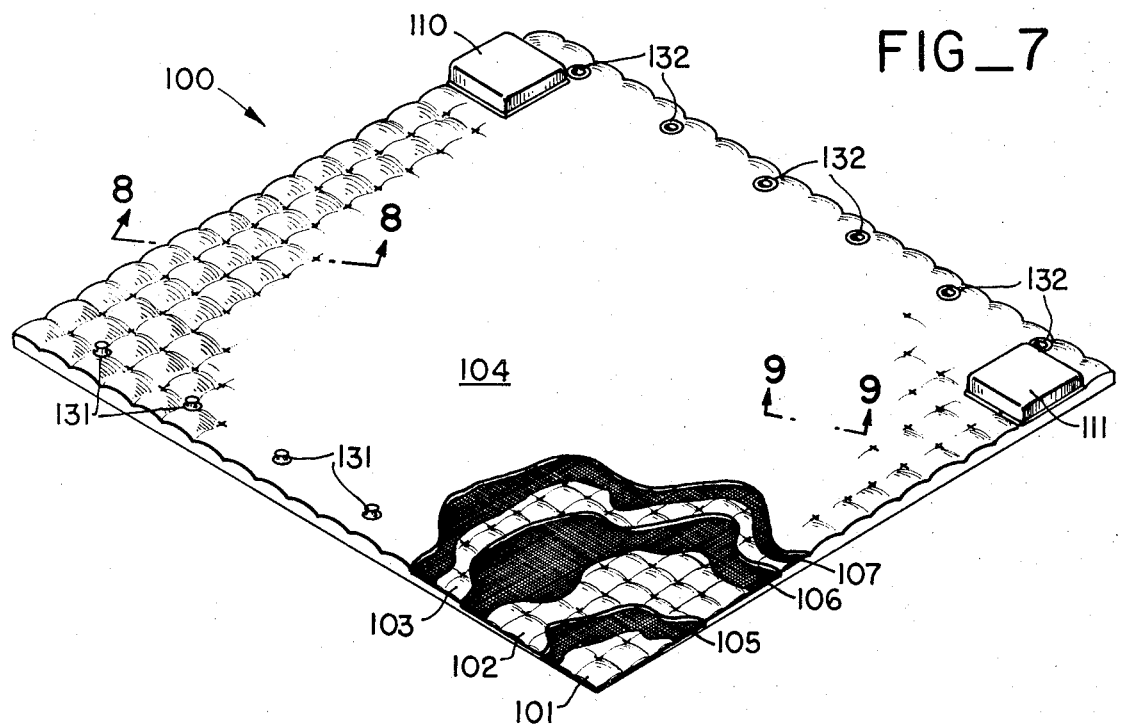
FIG_7
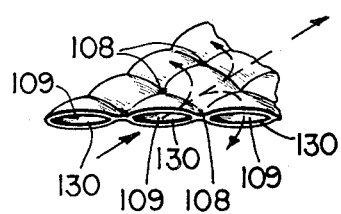
FIG_8
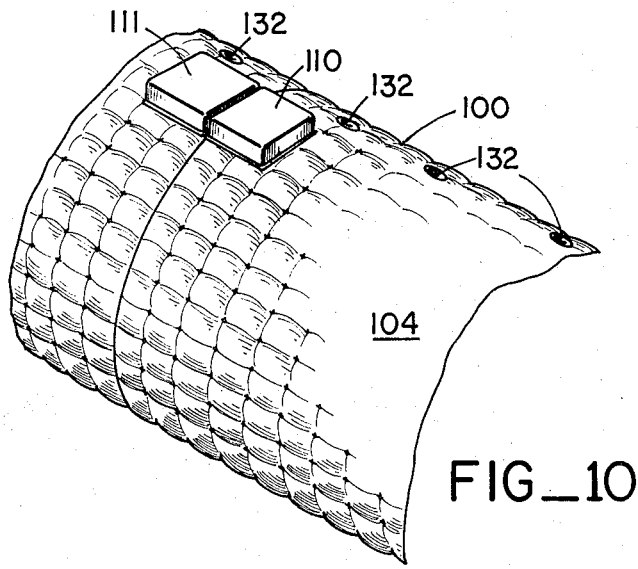
FIG_10
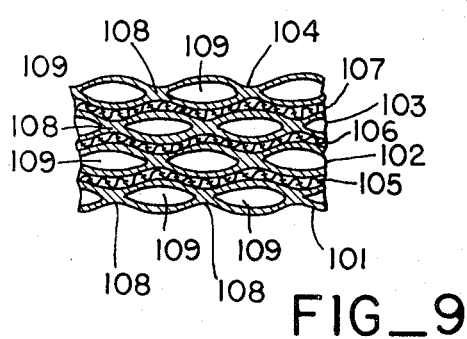
FIG_9
INVENTOR.
JOHN E. LINDBERG
BY
ATTORNEYS

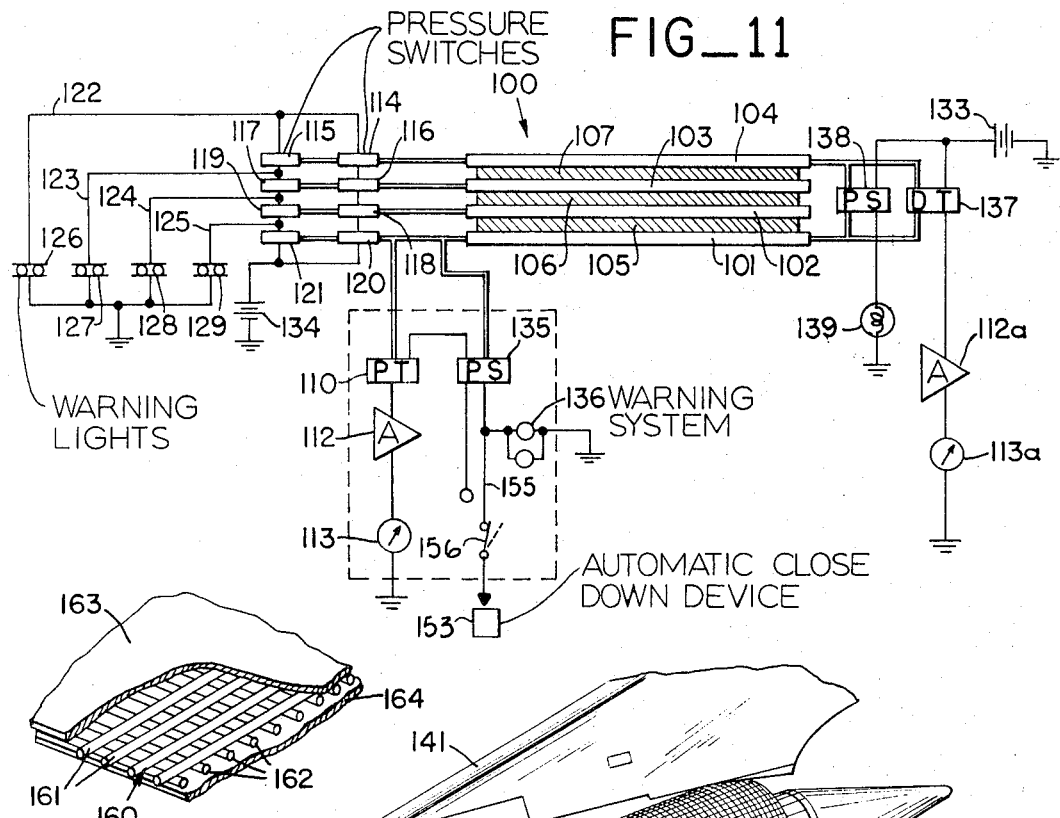
FIG_11
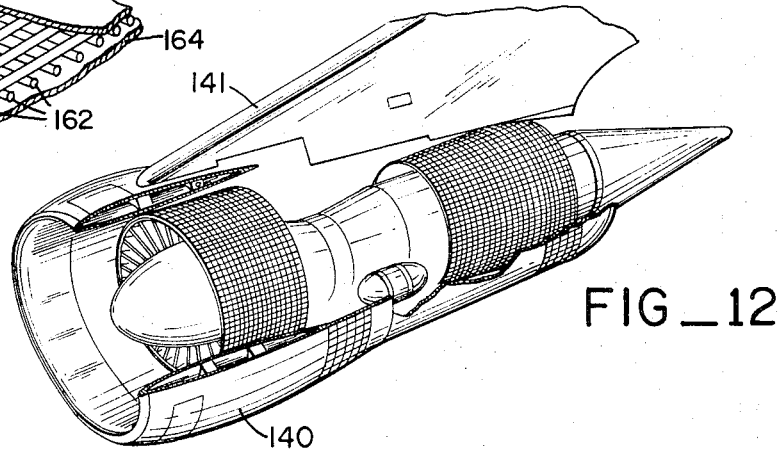
FIG_18
FIG_12
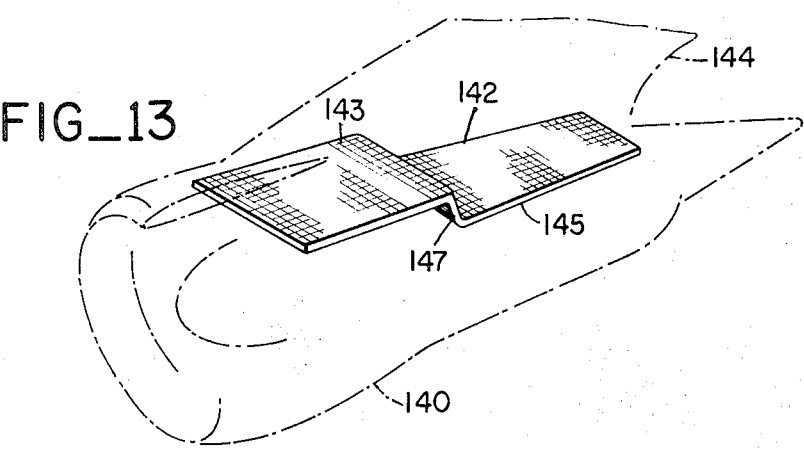
FIG_13

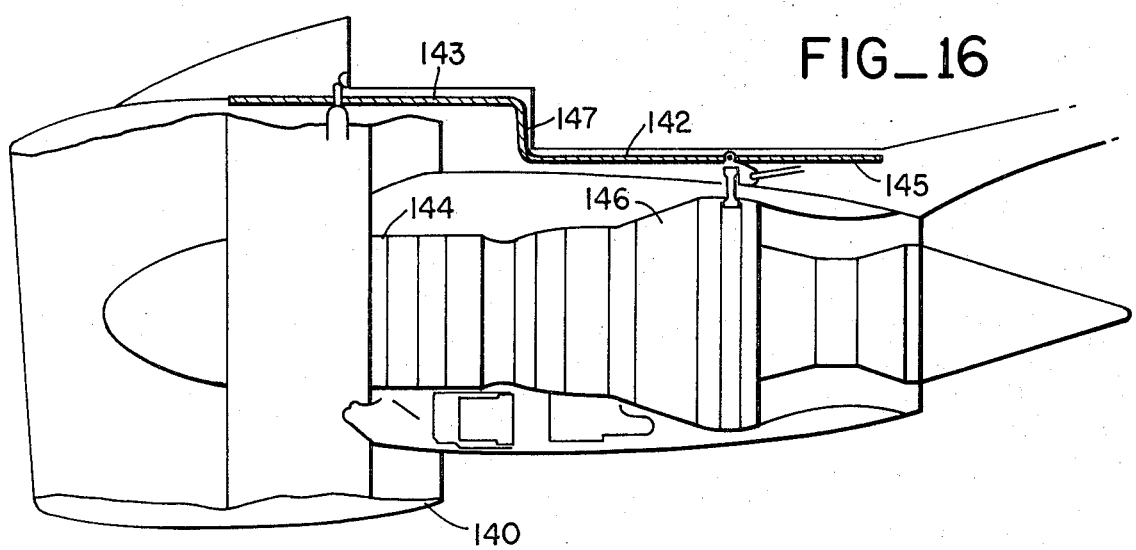
FIG_16
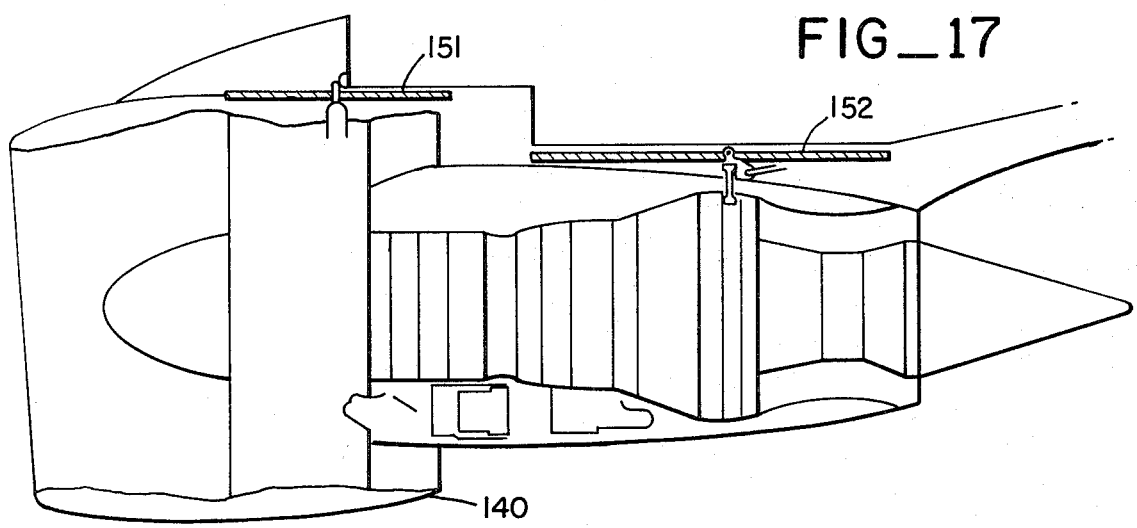
FIG_17
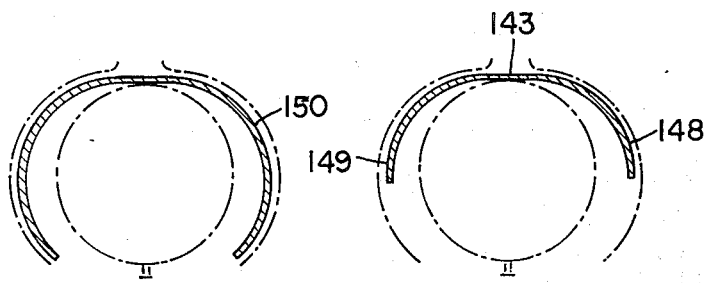
FIG_15   FIG_14

FIRE-WALL AND BURN-THROUGH PROTECTION SYSTEM

CROSS-REFERENCES TO RELATED APPLICATIONS

This application is a continuation-in-part of application Ser. No. 118,892 filed Feb. 25, 1971, now abandoned which was a continuation-in-part of application Ser. No. 756,084, filed Aug. 12, 1968, now abandoned, which was a continuation-in-part of application Ser. No. 689,671, filed Dec. 11, 1967, now abandoned.

BACKGROUND OF THE INVENTION

This invention relates to a device for detecting burn-through and blade shrapnel from or in jet engines and the like. It also relates to a device for limiting or slowing down the spread of fire and to enable more effective remedial action.

When malfunctions in a jet engine cause burn-through or cracked blades begin hurling shrapnel, very little time is available for the pilot to act. Heretofore, the pilot has generally had no warning until things were too late to do any good. The present invention has the purpose of giving the pilot an opportunity to do something by giving him a warning when the burn-through or shrapnel-flinging begins; in a preferred form it also limits or slows down the spread of the fire. It may be so arranged that a certain degree of penetration -- such as total penetration due to catastrophic engine failure -- will automatically shut down the engine.

It should be emphasized that nothing like the present invention is in use today. Attempts have been made to improve the fire wall, but no satisfactory way of obtaining warnings of burn-through at every point thereof have been provided. Where fire detection systems have been provided in conjunction with a fire wall, the systems have been linear or for points only, -- not capable of detecting burn-through or overheat at every point of the fire wall. This deficiency has been dangerous since flames have often acted upon a very small area that did not include the locus of the fire detector. In others the fire had already had disastrous effects by the time it affected the fire detection apparatus. It is essential to provide area fire and overheat detection, not just linear fire and overheat detection in this environment.

Moreoever, while some improved fire walls have been provided, none, it is believed, have been so good as the one provided by this invention, which not only gives warning of failure but also can give warning of changing conditions and can even (1) indicate the arithmetic average temperature of the area of the fire wall, (2) measure the area arithmetic average differential temperatures between the inside and the outside of the fire wall, and (3) warn whenever any local point of the entire fire wall exceeds a predetermined peak temperature. Still further, the fire wall of this invention can, in some forms, be unusually resistant to burn-through.

BRIEF SUMMARY OF THE INVENTION

The invention uses at least one hollow fire wall and, preferably, a plurality of them. Each hollow fire wall has an outside metal wall and an inside metal wall that are connected together at many points over the area by a large number of welds that keep the spacing constant and provide between them a continuous chamber. This chamber is kept either at substantially a vacuum or at a multiple of atmospheric pressure. Where there are a plurality of such hollow fire walls, they are laminated together. Sometimes they are arranged so that the ones on each side of the laminar assembly are kept well above atmospheric pressure and the ones between them are kept at a vacuum. These laminations may follow immediately one upon another, but a better and improved structure provides insulation between them, and vacuum in a chamber gives the result that a burn-through of that layer at a local spot tends to cause the flame energy to spread out and be dispersed over a wide area, so that it becomes increasingly difficult for it to burn through the succeeding layers. This wall is in itself significant in preventing the spread of fires, whether or not there is any indicator system in association with it.

A pressure-actuated electrical switch is preferably located far enough away from or behind the fire wall itself so that it is not in danger of being burned or of being made inoperative by the very phenomenon which it is to detect and to call to the attention of the pilot. The switch is connected to the fire wall by a tube. Preferably, pressure switches are duplicated in so-called redundancy arrangements to make sure that at least one of them will work. Also, they are preferably used in conjunction with an electrical circuit which itself may have redundant lights. Each chamber may have a switch in series with switches of the other chambers, so that one redundant switch of each chamber must operate if the full penetration warning or control is to occur. Failure of one or more switch cannot give false warning.

In addition to the pressure switches, there may be pressure transducers or gauges that indicate the temperatures at various chambers, either area arithmetic averages or highest local peaks. Also, the complete device may be made in several units, with the units connected in series or in parallel as may be desired.

Other objects and advantages of the invention will appear from the following description of some preferred embodiments.

BRIEF DESCRIPTION OF THE DRAWINGS

In the drawings:

FIG. 1 is a fragmentary view in perspective of a portion of an airplane with a jet engine pod partly cut away to disclose a novel fire-wall embodying the principles of the invention.

FIG. 2 is a circuit diagram of the warning system used with the structure of FIG. 1.

FIG. 3 is an enlarged view in perspective of a similar type of fire-wall used to give a dual integrity type of operation.

FIG. 4 is a circuit diagram of the warning system used with the device of FIG. 3.

FIG. 7 is an isometric view of a flexible fire wall assembly having four layers and embodying the principles of the invention in a modified form. The unit is cut away at places to show the different layers and the insulation between them.

FIG. 8 is a view in section taken along the line 8—8 in FIG. 7.

FIG. 9 is a view in section taken along the line 9—9 in FIG. 7.

FIG. 10 is a fragmentary view in perspective showing how two units like the unit of FIG. 7 may be joined together and may be arranged to cover a cylinder or jet engine.

FIG. 11 is a more diagrammatic view of the assembly of FIG. 7 in conjunction with an electrical circuit.

FIG. 12 is a view in perspective, with portions broken away, of a jet engine assembly employing a fire wall of this invention.

FIG. 13 is a more diagrammatic view showing how a fire wall of this invention may be confined to the upper portion only where the connection between the pod and the wing occurs, which is the most critical portion.

FIG. 14 is a view somewhat diagrammatic in nature and transverse to the view of FIG. 13 of a somewhat modified form in which the blanket is extended to provide protection in the areas of flying blades.

FIG. 15 is a view similar to FIG. 14 showing how the blanket may be further extended to give all around protection.

FIG. 16 is a view in elevation and in section, somewhat diagrammatic in nature, of the unit of FIG. 13.

FIG. 17 is a view similar to FIG. 16 of a modified form of the invention in which there are two separate fire walls instead of a single continuous one.

FIG. 18 is a fragmentary view in perspective, partially cut away and shown in section, of a modified form of fire wall structure.

DESCRIPTION OF PREFERRED EMBODIMENTS

Figure 5:
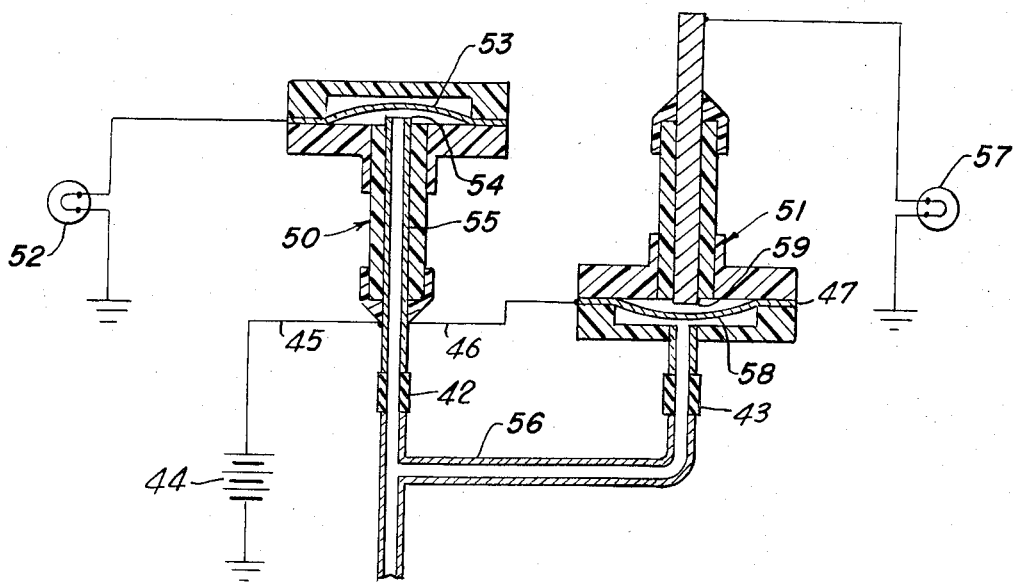
FIG. 5 is a circuit diagram, similar to FIG. 2, of a modified form of warning system used with the structure of FIG. 1 or with that of FIG. 6.

The normal fire-wall which separates an engine pod 10 from a suspension member 11 attached to the wing 12 or fuselage is replaced in this invention by a novel fire-wall 15 which I call a pressure-cavity fire-wall. In my new structure two sheets 16 and 17 of normal fire-wall metal are sealed together in a spaced-apart relationship by a rim wall 18. They may also be held at a fixed spacing by a series of spot welds 19, leaving a space 20 between them. This space 20 may be filled with gas under pressure or may be evacuated, so that the pressure inside is, in either event, markedly different from atmospheric pressure, and a tube 21 leads from the space 20 to a pressure-sensitive switch 22 (FIG. 2). Under normal conditions, the pressure in the space 20 and tube 21 is retained, and pressure-retention is indicated on an alarm device 23 by a "no-alarm" state. If burn through occurs, the pressure immediately changes to atmospheric or ambient (very low in high-altitude flying), and this change is used to set off the alarm. While an electrical alarm system 23 and electrical switch 22 are shown by way of example, the system 23 may be pneumatic or hydraulic.

FIGS. 3 and 4 show a dual-integrity type of system in which three metal sheets 30, 31, and 32 are used, again with rim welds 34 and 35 and again, preferably with spot welds 36. Thus two chambers 37 and 38 are provided, each like the space 20 described above, and two tubes 40 and 41 are provided, one leading from each cavity. The spot welds 36, which hold all the plates 30, 31, 32, together over the entire area, prevent any bulging due to internal pressure. All the edges are brought together and welded all around to seal these pressure-tight cavities. In this instance, the burn-through has to go into both chambers before it is effective. The first one may be made to give a warning, and the pilot may not decide to do anything until both give a warning, or they may be made to operate in series so that two or more must fail in order to operate the actuating device.

FIG. 4 also shows a branch electrical lead 37 going to a normally closed switch 38 through which current passes upon a burn-through of the walls 30, 31, and 32, to actuate an automatic shut-down device 39 for shutting down the engine and the fuel and oil and hydraulic fluid flowing to the area shut off by the firewall structure. The switch 38 may be manually opened to disable the automatic shut-down device 39 at the pilot's discretion.

A modified form of circuit is shown in FIG. 5. Here there are two pressure-sensitive switches 50 and 51, both operated by pressure conditions inside the firewall space 20. The switch 50 is substantially like the switch 21 shown in FIG. 2 and is connected to a warning lamp 52 which gives warning when the pressure changes toward or to atmospheric and closes a diaphragm 53 against a contact 54 forming the end of a metal tube 55. The switch 50 is thus operated under exactly the same conditions as was the switch 21, namely, when the pressure inside the fire-wall space 20 changes to a critical point, which is set as desired. For example, the drawing is shown in a condition where the initial pressure is above atmospheric. For use with an initial pressure below atmospheric, the switch 50 would be made like the switch 51.

The tube 55 is joined by a branch tube 56 to a normally open pressure switch 51 having in association with it a warning lamp 57. The tube 55 is electrically insulated from the tube 56 by an insulator 42, and the switch 51 is similarly insulated electrically from the tube 56 by an insulator 43. A battery 44 is connected by a lead 45 to the tube 55 and thereby to the contact 54. A lead 46 connects the tube 55 (and thereby the battery 44) to the diaphragm 47 of the switch 51. (With an initial operating pressure below atmospheric, the switch 51 could be normally closed at atmospheric pressure). With above-atmospheric pressure in the unit, the switch 51 is closed with the diaphragm 58 is forced by an increase in pressure to come against a contact 59. Thus a change in pressure to a predetermined lower level actuates the switch 50 and lights the lamp 52, while a change in pressure to a predetermined higher level actuates the switch 51 and lights the lamp 57. Only one of the switches 50 or 51 will be closed at any one time, and in the normal fault-free condition both are open. Consequently, the same double-walled fire-wall acts as an overheat detector showing overheat conditions (as a function of area arithmetic average temperature) prior to actual burn-through. The switch 51 is set to indicate attainment of a predetermined pressure expressing the fact of such overheat conditions. At some predetermined high temperature, the gas in the space 20 will have its pressure increased enough to close the switch 51 and light the lamp 57. Hence, if the engine within the fire-wall overheats to this degree, the rise in temperature results in actuation of the switch 51. If the burn-through subsequently occurs, the pressure drops and the burn-through warning system is actuated, overriding the overheat warning system.

Figure 6:
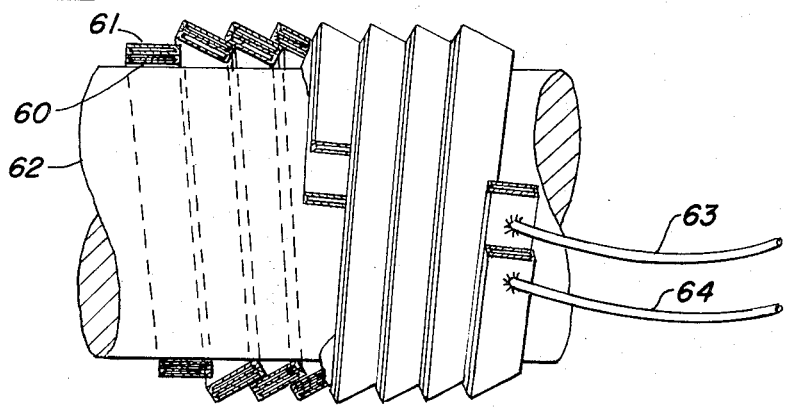
FIG. 6 is a fragmentary view in side elevation and partly in section of a modified form of device embodying the principles of the invention.

In the form of the invention shown in FIG. 6, two flattened or oval tubes 60 and 61 are wound spirally around an engine burner section 62, each overlapping itself to avoid gaps between adjacent turns. Two tubes 60 and 61, one wound over the other, are used to provide a so-called redundant system, like the system of FIG. 3. If that is not desired, a single tube 60 will be enough. The tubes 60 and 61 may be of any practical width, such as one or two inches wide. Preferably they are quite flattened to leave only a small internal cross sectional area. In order to give clarity, the dimensions and also the angles due to over-lap have had to be exaggerated and it should be understood that in actual appearance the structure is much flatter than what is shown in the drawing. Small outlet tubes 63 and 64 are welded to the tubes 60 and 61 and lead to circuits like those of FIG. 2 or FIG. 4 or FIG. 5, pressure-actuated switches being on the other ends of the tubes 63 and 64, and both tube systems being pressurized or evacuated and sealed.

The system of FIG. 6 works in the same manner as that of FIGS. 1 and 3. If a burn-through occurs, the flat tubes 60 and 61 will be burned in two at some spot, releasing the pressure of the gas or the vacuum in them and causing their responders to operate warning lamps or other signals. The responders may be in series, if desired, so that accidental loss of pressure in one unit will not cause a false alarm.

The units so far described illustrate the theory of the basic unit. For actual installation a more sophisticated form of the invention is preferred, such as is shown in FIGS. 7 through 11. Here, there is a blanket assembly 100 comprising four sub-assemblies 101, 102, 103, and 104 separated successively by insulating layers 105, 106, and 107. Each of the four sub-assemblies 101, 102, 103, and 104 is in general like that shown in FIG. 1 but is shown here as a pair of quilted or waffled metal sheets in which a large number of welds 108 provide interconnected cells 109, constituting, in effect, a single chamber for each sub-assembly, as shown in FIG. 8, with unrestricted flow between cells.

The material may be sheet molybdenum, and the welds 108 may be made by electron-beam welding of spots at the four corners of each cell 109. The cells 109 may be gas filled, preferably by an inert gas, or may contain a vacuum. In a preferred structure, the sub-assemblies 101 and 104 are filled with inert gas at two or three atmospheres of pressure, while the two inner sub-assemblies 102 and 103 have their cells 109 at a vacuum. The inert gas with preset pressure in the sub-assemblies 101 and 104 is desirable to give warning even when the aircraft is flying very high; while, to reduce damage from flame and to spread out the flame energy, it is preferable that the inner sub-assemblies 102 and 103 be at a vacuum.

The insulating members 105, 106 and 107 may be any of various materials, such as glass, quartz, carbon, or other high temperature material, preferably in the form of fibers made into a cloth, whether woven or not woven. Preferably, the blanket sub-assemblies 101, 102, 103, and 104 are cemented with a suitable bonding adhesive to the insulating layers 105, 106, and 107.

The inert gas prefill in the sub-assemblies 101 and 104 expands with temperature to raise the average pressure in the cells 109. These pressures may be read with the aid of pressure transducers 110 and 111 and there may be pressure transducers for any or all of the units, and the pressure reading may be calibrated as temperature. It becomes possible for the pilot to compare the average temperature of the gas in the innermost unit 101 with that of the outermost unit 104, and this gives him important information. Alternatively, he may need to know only the difference between these two temperatures, and that is also possible. The pressure transducer 110 may in that instance, as shown in FIG. 11, be connected to a suitable amplifier 112 which feeds the signal to a suitable indicating gauge 113.

There may be two pressure switches ("redundant") for each sub-assembly, as shown in FIG. 11 where there are pressure switches 114, 115, and 116, 117, and 118, 119, and 120, and 121 to give the well known advantage of so-called "redundancy." Each pair of these switches may have an alarm circuit 122 or 123 or 124 or 125 which has redundant alarm lights 126 or 127 or 128 or 129, which are preferably doubled for that same reason. A pilot looking at the series of lights 126, 127, 128, and 129 corresponding to the four sub-assemblies 101, 102, 103, and 104 can tell the degree of penetration at once, and a catastrophic failure is indicated by the flame warnings at all these lights. Preferably each of the switches 114, 115, 116, 117, 118, 119, 120, and 121 is normally open and is closed to actuate its alarm circuit. They may close when an average temperature exceeds a preset temperature level or, by another modification of the unit of this invention, may be actuated if any point exceeds a preset peak temperature.

For the sake of this last alternative, the cells 109 in at least one of the blanket assemblies 104, or in as many of them from which this information is desired, is provided with an inner coating or layer 130 of a metallic hydride which is ingassed heavily with hydrogen and which will outgas it a desired peak temperature. The metal employed here may be titanium, vanadium, zirconium, hafnium, palladium, tantalum or any of those mentioned in my U.S. Pat. No. 3,277,860. The unit then acts so that the hydride outgasses at a certain selected critical temperature to give a volume of gas sufficient to increase the pressure by the amount for which the pressure switches 114 and 115 are set.

As shown in FIG. 11, there may also be lead 155 extending from the switch 135 to a normally closed switch 156, which, upon power appearing in the lead 155, actuates an automatic closedown device 157 to shut down the engine and all flow of combustibles to the engine area upon catastrophic failure detection. The switch 156 can be manually opened to remove this automatic close-down, at the will of the pilot.

As shown in FIGS. 7 and 10, the blanket assembly 100 may be provided with male snap fasteners 131 along one edge and female snap fasteners 132 along another edge, for closing the assembly 100 around a cylindrical or other shape.

FIG. 11 shows batteries 133, 134, preferably 28-volt batteries (or similar D-C supply). It also shows a pressure switch 135 and warning system 136 associated with the pressure transducer 110, though preferably remote from it. There is also shown a differential transducer 137 and associated pressure switch 138, for comparing the pressures --and hence temperatures--in the sub-assemblies 101 and 104. A suitable amplifier 112a and gauge 113a may be provided, with a suitable warning lamp (or lamps) 139.

The penetration of such a blanket 100 by flame or by a missile particle such as a blade or shrapnel thrown by the centrifugal force through a wall of the engine and into or through the blanket causes a loss of pressure in the outside blankets 101 and 104 and a gain in pressure in the two inner blankets 102 and 103, all of which results in the alarm as before described.

FIGS. 12 through 17 show how some of the fire wall locations may be chosen in relation to the jet engine. The fire wall is particularly concerned to protect the connection between the pod 140 and the wing 141 on which it is mounted. This is the most critical part, and the part which most endangers the aircraft. As shown in FIGS. 13 and 16, a fire-wall 142 of this invention may be confined to this area, it may be a single continuous fire wall like the blanket of FIG. 10, with a fore portion 143 above the compressor 144 and an aft portion 145 above the burner 146 and connected to the portion 143 by a step 147. As shown, the fire-wall 142 needs no warning device, though it may have a warning device, if desired. Moreover, the fire-wall 142 may be a simple two-wall or three-wall structure with vacuum or pressure therebetween and the walls kept apart as shown in FIGS. 1–4.

As shown in FIG. 14, there may, as an alternative, be depending portions 148 and 149 on each side to protect in the area where flying blades are possible, or, as shown in FIG. 15, a unit 150 may provide all around protection and throughout the whole unit.

As shown in FIG. 17, instead of a single fire-wall assembly 142, there may be two or more blankets 151 and 152 assemblies, which may be connected separately or in parallel or in series.

As shown in FIG. 18, a fire-wall according to this invention may be made by using a screen 160 (especially of the type where all the wires 161 going in one direction overlie all the wires 162 going in the other direction) to separate one wall 163 from another wall 164, thereby providing a continuous chamber between the walls 163 and 164. Spot welds may be applied at suitable intervals to secure some wires 161 to the wall 163 and some wires 162 to the wall 164.

Figure 19:
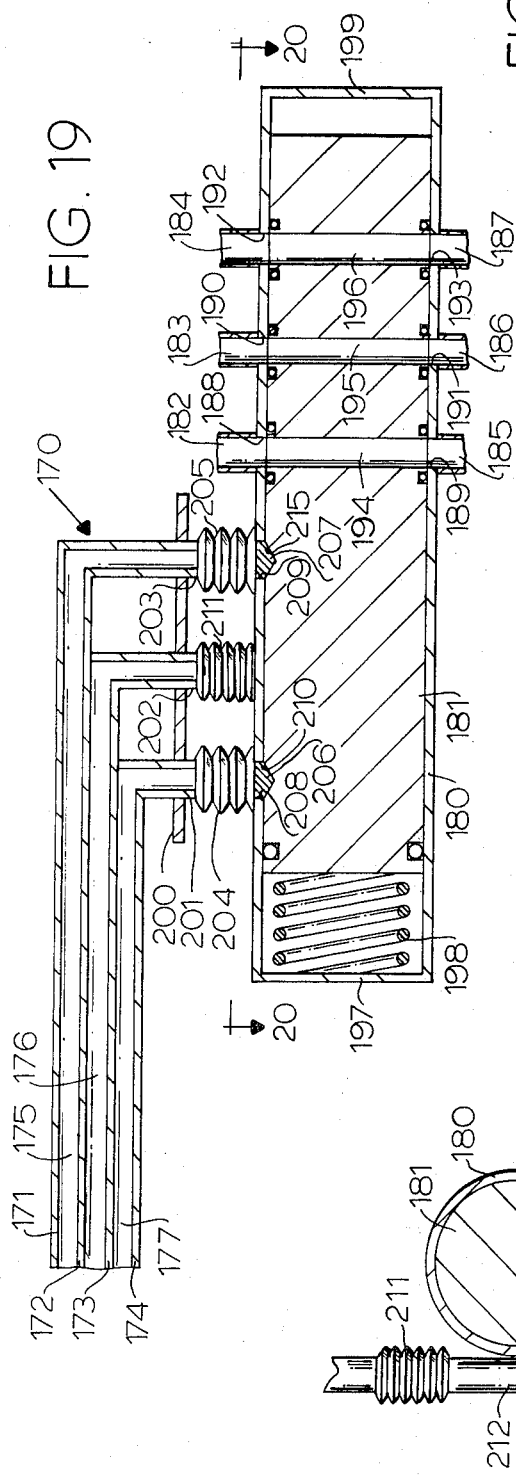
FIG. 19 is a somewhat diagrammatic fragmentary view in section taken along the line 19—19 in FIG. 20, of a firewall embodying the principles of the invention operating a mechanism for shutdown of fuel, oil and hydraulic fluid lines.
Figure 20:
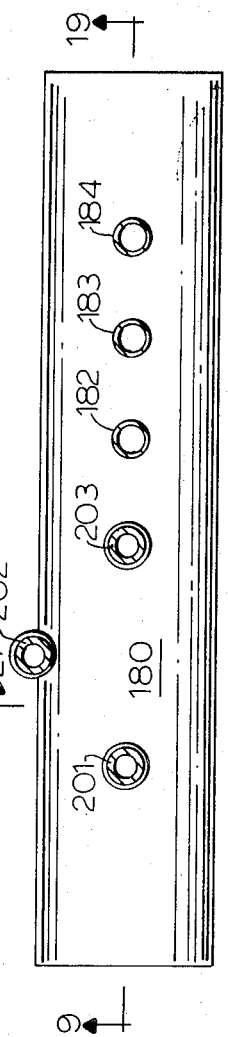
FIG. 20 is a view in section taken along the line 20—20 in FIG. 19.
Figure 21:
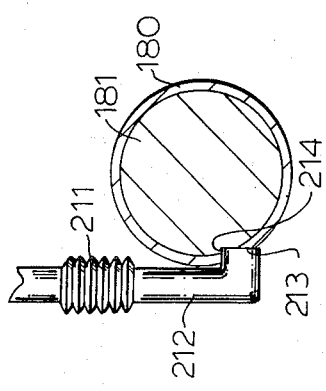
FIG. 21 is a view in section taken along the line 21—21 in FIG. 20.

FIGS. 19 to 21 show another system for automatic shut-down. Here, no warning system is shown, though one may be provided if desired.

A fire wall 170 comprises, here, four walls 171, 172, 173, and 174 of high-temperature-resistant metal, with spacers (as shown before but not illustrated here) providing chambers 175, 176, and 177. A cylinder 180 has a piston 181. The fuel, oil, and hydraulic fluid are normally conducted behind the fire wall 170 by conduits 182, 183, 184, and these conduits are supplied by conduits 185, 186, and 187 on the opposite side of the fire wall 170. The cylinder 180 has diametrically spaced openings 188 and 189 connected respectively to the conduits 182 and 185; it also has openings 190 and 191 respectively connected to the conduits 183 and 186; it further has openings 192 and 193 connected respectively to the conduits 184 and 187. The piston 181, when held in the position shown in FIGS. 19 and 20, has a first through passage 194 joining the openings 188 and 189, a second through passage 195 joining the openings 190 and 191, and a third through passage 196 joining the openings 192 and 193.

The piston 181 is urged away from a head 197 by a spring 198, and when the piston 181 is not locked in the position shown in FIGS. 19 and 20, it moves to the right against a head 199 and then the passages 194, 195, and 196 no longer register with their associated openings, so that flow of the fluids is cut off.

A plate 200 supports conduit ends 201, 202, and 203 from the chambers 175, 176, and 177, and support bellows 204 and 205 and latches 206 and 207 that, so long as the conduits 201 and 203 are under pressure, lock the piston 181 in place, going through openings 208 and 209 in the cylinder 180 and engaging notches 210 and 215 in the piston 181. A third bellows 211 is associated with a latch 212 that extends over a groove 213 in the cylinder 180 and locks against a shelf 214 in the piston 181. When the walls 171, 172, and 173 are penetrated, the release of pressure in the chamber 175 and 177 retracts the bellows 204 and 205 and latches 206 and 207, and the rise in the chamber 176 acts with bellows 211 to release the latch 212, so that the spring 198 moves the piston 181 and closes off the three fluids. Note that there is no such cut-off in this instance until three walls 171, 172, and 173 have been penetrated by fire.

Figure 22:
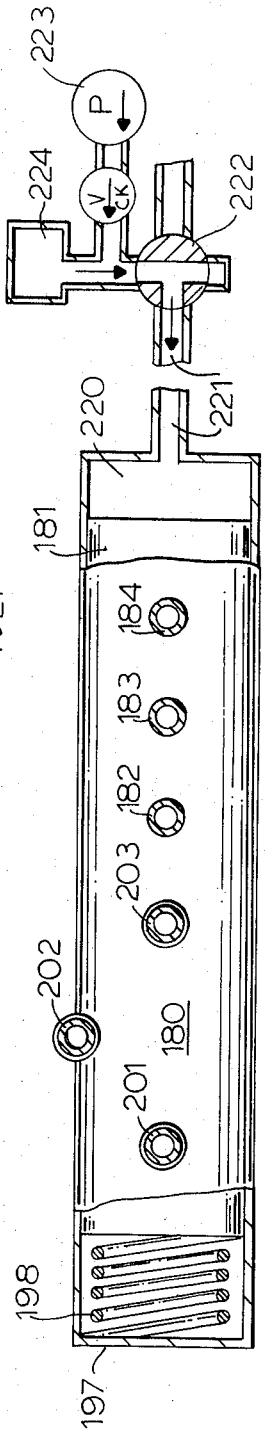
FIG. 22 is a fragmentary view in elevation and partly in section of a modified form of devcie like that of FIGS. 19-21.

In FIG. 22 a similar system is employed, but the cylinder 180 has a chamber 220 connected to a pneumatic conduit 221. The conduit 221 goes to a pilot-controlled valve 222 that can be turned to send air from an accumulator 224 to put the piston 181 back in fluid-conducting position. The accumulator 224 is recharged by a compressor 223, through a check valve, when the aircraft's electrical system is operating.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A fire-wall and a burn-through detection system, including in combination:
   a plurality of high-temperature-resistant, high strength, ductile metal walls hermetically sealed together to provide a hollow metal fire-wall with sealed chamber means therebetween,
   a series of spot welds from one said metal wall to another said metal wall for rigidly spacing said metal walls apart from each other,
   means providing a predetermined level of pressure significantly different from atmospheric in said chamber means,
   a normally open pressure-sensitive electrical switch remote from said fire wall and closed by a change in said pressure from said predetermined level,
   a tube connecting the pressure-sensitive portion of said switch to said chamber means, and an electrical warning system actuated by said switch.

2. The fire-wall and burn-through detection device of claim 1 having a charge of metallic hydride of a type capable of releasing large quantities of hydrogen when heated, between two said walls and distributed over a chosen area thereof.

3. The device of claim 1 wherein there are two said pressure-sensitive switches for each said chamber means and an electrical warning system for each said switch.

4. The device of claim 1 having in addition, means for detecting changes in said pressure whether to below or above said predetermined level.

5. The device of claim 1 wherein the pressure inside said chamber means is normally at least double atmospheric pressure.

6. A fire-wall and a burn-through detection system, including in combination:
  a hollow metal fire wall provided by a continous tubular formation hermetically sealed to itself in a generally helical pattern with metal wall portions rigidly spaced apart to provide sealed chamber means therebetween,
  means providing a predetermined level of pressure significantly different from atmospheric, in said chamber means,
  a normally open pressure-sensitive electrical switch remote from said fire wall and closed by a change in said pressure from the predetermined level,
  a tube connecting the pressure-sensitive portion of said switch to said chamber means, and
  an electrical warning system activated by closure of said switch.

7. The device of claim 6 wherein said tubular formation comprises a flattened tube.

8. The device of claim 6 wherein there is a pair of such flattened tubes.

9. A fire-wall and a burn-through detection system, including in combination:
  a. an assembly, comprising a plurality of pairs of facing metal walls, each pair being hermetically sealed together and rigidly spaced apart to provide sealed chamber means there between, successive pairs being laminated in face-to-face relationship,
  b. insulating means between successive said pairs, and
  c. means providing pressure significantly different from atmoshpheric in each said chamber means, and
  d. a plurality of means for each said chamber for detecting a change in said pressure from the predetermined level.

10. The device of claim 9 wherein a plurality of spot welds help to provide the rigid spacing apart of the walls.

11. The device of claim 9 having each pair of metal walls waffled and sufficiently flexible for forming a curved surface, said chambers comprising a large number of interconnected cells.

12. The device of claim 11 wherein at least one face of each pair of metal walls is cemented to a face of said insulating means.

13. The device of claim 11 wherein said assembly has a plurality of snap fasterners along two opposite edges for snapping together to make a generally cylinderical assembly.

14. The device of claim 11 wherein a plurality of assemblies is provided joined together in end-to-end relatioship, each assembly having a pair of pressure transducers, one from each assembly being joined to one of the succeeding assembly.

15. The device of claim 9 wherein there are four said pairs, four said chamber means, and three said insulation means, so that there are two outside pairs and two inside pairs, the inside pairs lying between two insulating means.

16. The device of claim 15 wherein said means providing pressure provides pressure above atmospheric in the chambers of the outside pairs and a vacuum in the chambers of the inside pairs.

17. The device of claim 9 wherein said pressure-change indicating means comprises two electrical pressure switches for each said chamber and an electrical warning system indicating for each said switch.

18. The device of claim 9 having in addition, calibrated means for detecting the level of said pressure in at least one said chamber in terms of the temperature in said chamber.

19. The device of claim 9 having metal hydride of the type capable of liberating gross amounts of hydrogen when heated to a predetermined temperature, said hydride being distributed inside the chamber means of at least one said pair of walls, to give discrete-temperature warning.

20. The device of claim 9 wherein screen means between each pair of metal walls help to provide the rigid spacing apart of the walls and the chamber means.

* * * * *